(12) United States Patent
Webb et al.

(10) Patent No.: US 8,525,791 B2
(45) Date of Patent: *Sep. 3, 2013

(54) MINIATURE KEYBOARD FOR A HAND HELD COMPUTER

(75) Inventors: William Webb, Redwood City, CA (US); Alan C. Urban, San Jose, CA (US); Richard Gioscia, Santa Clara, CA (US); Lawrence Lam, San Jose, CA (US); David Northway, San Carlos, CA (US)

(73) Assignee: Palm, Inc., Sunnyvale, CA (US)

( * ) Notice: Subject to any disclaimer, the term of this patent is extended or adjusted under 35 U.S.C. 154(b) by 1214 days.

This patent is subject to a terminal disclaimer.

(21) Appl. No.: 11/851,076

(22) Filed: Sep. 6, 2007

(65) Prior Publication Data

US 2007/0296705 A1    Dec. 27, 2007

Related U.S. Application Data

(63) Continuation of application No. 11/417,010, filed on May 2, 2006, now Pat. No. 7,269,000.

(51) Int. Cl.
*G06F 3/02* (2006.01)
*G09G 5/00* (2006.01)

(52) U.S. Cl.
USPC ............... 345/168; 361/679.15; 361/679.17

(58) Field of Classification Search
USPC ............... 345/168–178; 178/18.01–18.11; 361/679.15, 679.17, 679.13, 679.3
See application file for complete search history.

(56) References Cited

U.S. PATENT DOCUMENTS

| 6,147,858 | A | * | 11/2000 | Takahashi | 361/679.08 |
|---|---|---|---|---|---|
| D454,347 | S | * | 3/2002 | Chung et al. | D14/320 |
| 6,385,463 | B1 | * | 5/2002 | Lieberman et al. | 455/557 |
| 6,734,809 | B1 | * | 5/2004 | Olodort et al. | 341/22 |
| 7,130,669 | B2 | * | 10/2006 | Moon | 455/575.3 |
| 2002/0063690 | A1 | * | 5/2002 | Chung et al. | 345/168 |
| 2002/0186525 | A1 | * | 12/2002 | Singh | 361/680 |
| 2003/0197745 | A1 | * | 10/2003 | Daly | 345/905 |

* cited by examiner

*Primary Examiner* — Michael Pervan

(57) ABSTRACT

A miniature keyboard for a palm held computer is disclosed. The miniature keyboard includes a plurality of keys for providing input to a hand held computing device. The keyboard includes a platform supporting the plurality of keys. The platform is configured to be sized for use by a single hand and the platforms is selectively foldable to substantially conceal the plurality of keys from view. The keyboard also includes a support structure that couples the platform to the hand held computing device body. The support structure is configured to prevent substantial movement of the platform relative to the hand held computing device body.

20 Claims, 4 Drawing Sheets

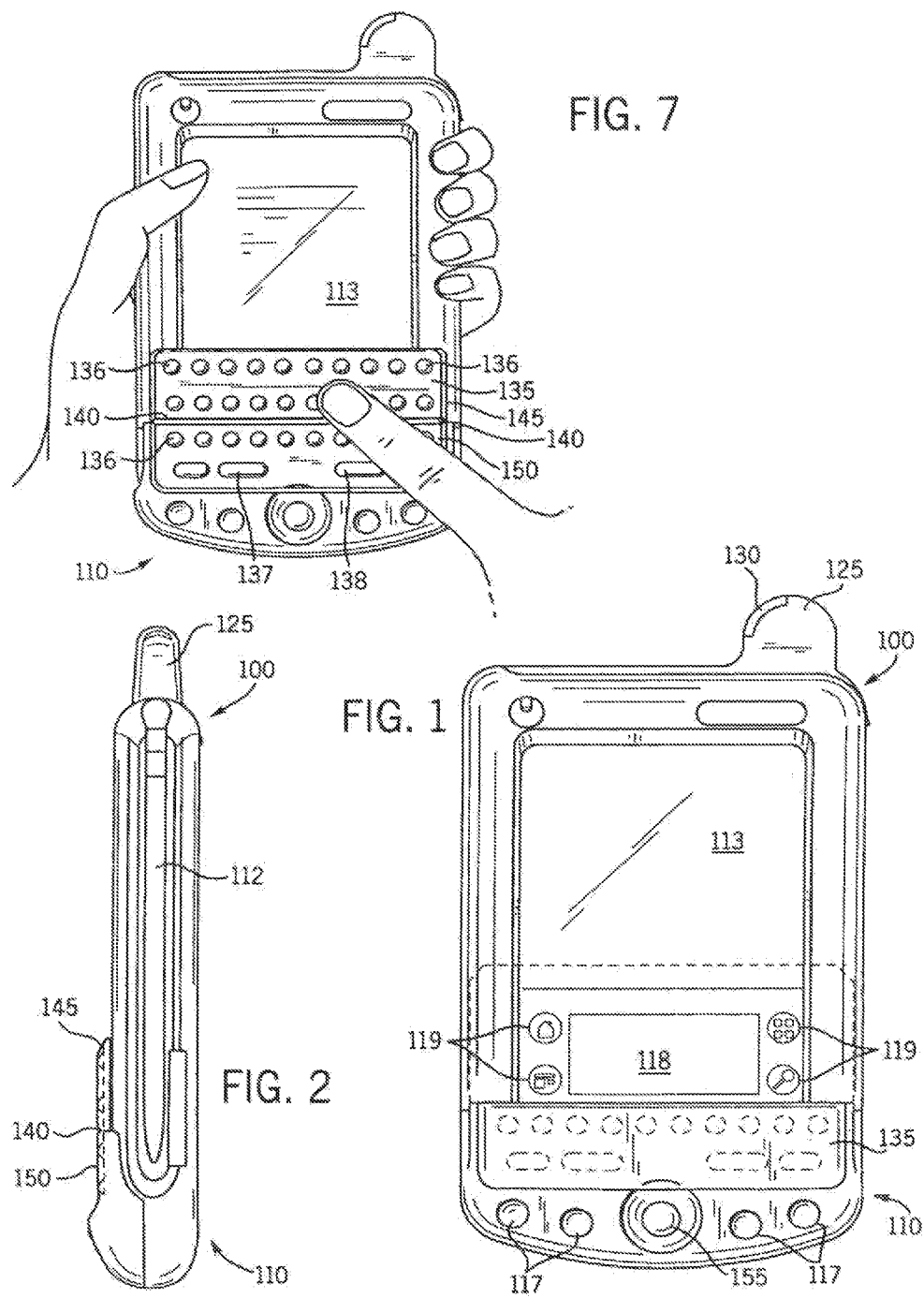

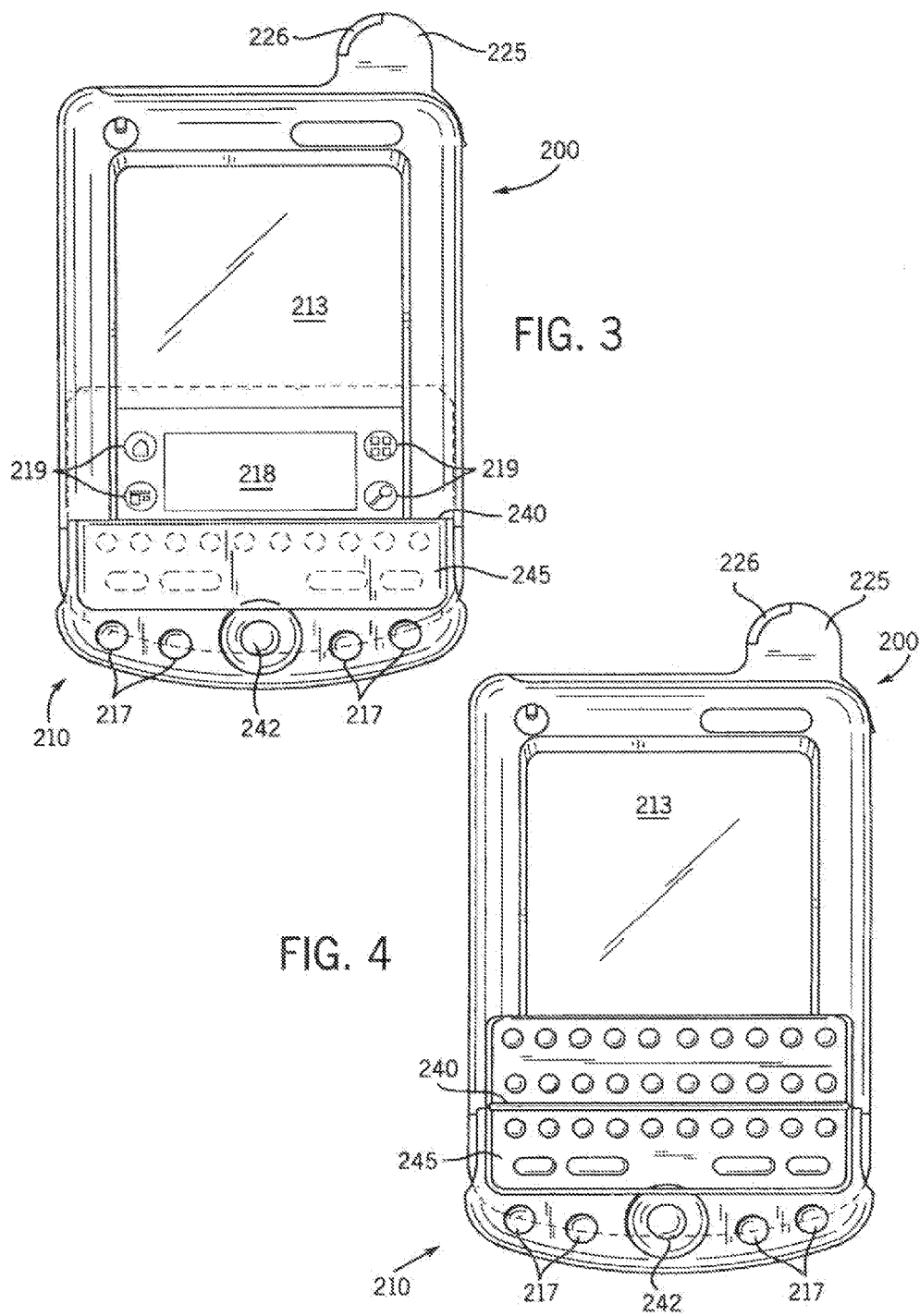

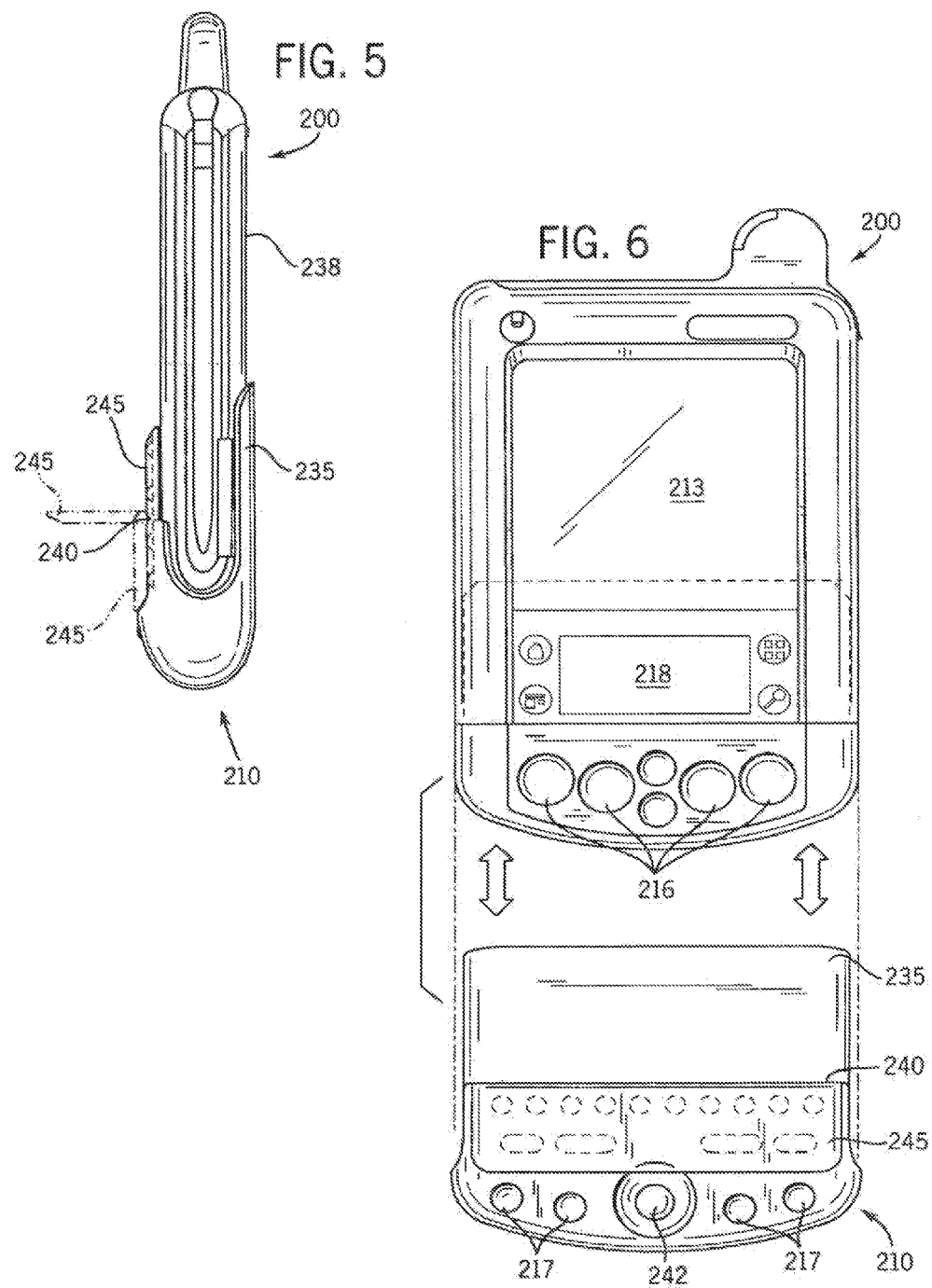

MINIATURE KEYBOARD FOR A HAND HELD COMPUTER

FIELD OF THE INVENTION

The invention relates to input devices for portable electronic devices such as, but not limited to hand held computing devices. In particular, the invention relates to a miniature keyboard for a hand held computer device in which the keyboard is foldable to provide selective access to the keys. Further, the miniature keyboard may be configured as a separate accessory that is attachable to the hand held device or may be configured as an integrated input device.

BACKGROUND OF THE INVENTION

Hand held computing devices, "palmtops", "palmhelds", PDAs or hand held computers typically weigh less than a pound and fit in a pocket. These hand helds generally provide some combination of personal-information management, database functions, word processing and spreadsheets. Because of the small size and portability of hand held computers, strict adherence to hardware constraints, such as input device hardware constraints, must be maintained.

It is conventional to employ a touch pad or handwriting recognition area and/or device to provide input to the hand held computer. Because of the small size of hand held computers, data input in an efficient and ergonomic manner is often an issue. Accordingly, handwriting recognition areas and touch pads are used to facilitate such data input. Further, full size keyboards, which couple to the electronic serial connector of hand held computers, have been produced. Such full size keyboards may be configured to be separately foldable for storage and for portability.

Accordingly, there is a need for a miniature sized keyboard configured for use with a hand held computer that is couplable to the electrical connector of the hand held computer and which is configured to support the hand held computer such that relative movement between the hand held computer and the detachable keyboard are minimized. Further, there is a need for a miniature keyboard being configured of a size to be typed on with a single hand and providing good support to minimize movement between the keyboard device and the hand held computer. Further still, there is a need for a miniature keyboard having a keypad area that may be selectively concealed when the keypad is not being utilized without requiring detachment of the miniature keyboard assembly from the hand held computer. Yet, further still, there is a need for a miniature keyboard that may be integrated into the hand held computer.

The techniques herein below extend to those embodiments which fall within the scope of the appended claims, regardless of whether they accomplish one or more of the above mentioned needs.

SUMMARY OF THE INVENTION

An exemplary embodiment of the invention relates to an input device for a hand held computing device. The hand held computing device includes a body, a display area, and an electrical connector. The input device includes a plurality of keys for providing input to the hand held computing device. The input device also includes a platform supporting the plurality of keys. The platform is configured to be sized for use by a single hand and the platform is selectively foldable to substantially conceal the plurality of keys from view. Further, the input device includes a support structure coupling the platform to the hand held computing device body. The support structure is configured to prevent substantial movement of the platform relative to the hand held computing device body.

Another exemplary embodiment of the invention relates to an input device for a palm held electronic information device. The electronic information device includes a body, a display area, and an electrical connector. The input device includes a plurality of keys for providing input to the electronic information device. The input device also includes a platform supporting the plurality of keys. The platform is configured to be sized for use by a single hand. The platform includes a hinge to selectively move the plurality of keys from a stowed position to a useable position. Further, the input device includes an interface configured to electrically couple the platform to the electronic information device. Further still, the input device includes a support structure coupling the platform to the electronic information device body, the support structure is configured to prevent substantial movement of the platform relative to the electronic information device body.

Yet another exemplary embodiment of the invention relates to a miniature keyboard for a palm held computer. The palm held computer including a body, a display area, and an electrical connector. The miniature keyboard includes a plurality of keys configured to provide input to the palm held computer. The miniature keyboard also includes a platform configured to support the plurality of keys. Further, the miniature keyboard includes a keyboard electrical connector configured to interface with the palm held computer electrical connector. Further still, the miniature keyboard includes a support structure coupling the platform to the palm held computer body.

Yet further still, the miniature keyboard includes a hinge coupled to the platform and configured to selectively move at least a portion of the plurality of keys to a stowed position from an accessible position. Yet further still, an exemplary embodiment of the invention relates to a miniature keyboard for a hand held computer. A miniature keyboard includes a plurality of keys configured to provide input to the hand held computer. The miniature keyboard also includes a platform configured to support at least some of the plurality of keys. Further, the miniature keyboard includes a support structure for the platform integrated into the hand held computer. Further still, the miniature keyboard includes a hinge coupled to the platform and configured to selectively allow movement of the platform from a stowed position to an accessible position.

BRIEF DESCRIPTION OF THE DRAWINGS

The invention will become more fully understood from the following detailed description, taken in conjunction with the accompanying drawings, wherein like reference numerals refer to like elements, in which:

FIG. 1 is a depiction of a hand held computer having an integrated keyboard;

FIG. 2 is a side view of the hand held computer of FIG. 1;

FIG. 3 is a depiction of a hand held computer having a detachable keyboard;

FIG. 4 is a depiction of the hand held computer of FIG. 3 with the keyboard in an open position;

FIG. 5 is a depiction of the hand held computer of FIG. 3 showing the opening and closing aspect of the keyboard;

FIG. 6 is a depiction of the keyboard being attached or detached;

FIG. 7 is a depiction of a user typing on the keyboard; and

DETAILED DESCRIPTION OF THE PREFERRED EMBODIMENTS

Figure 8:
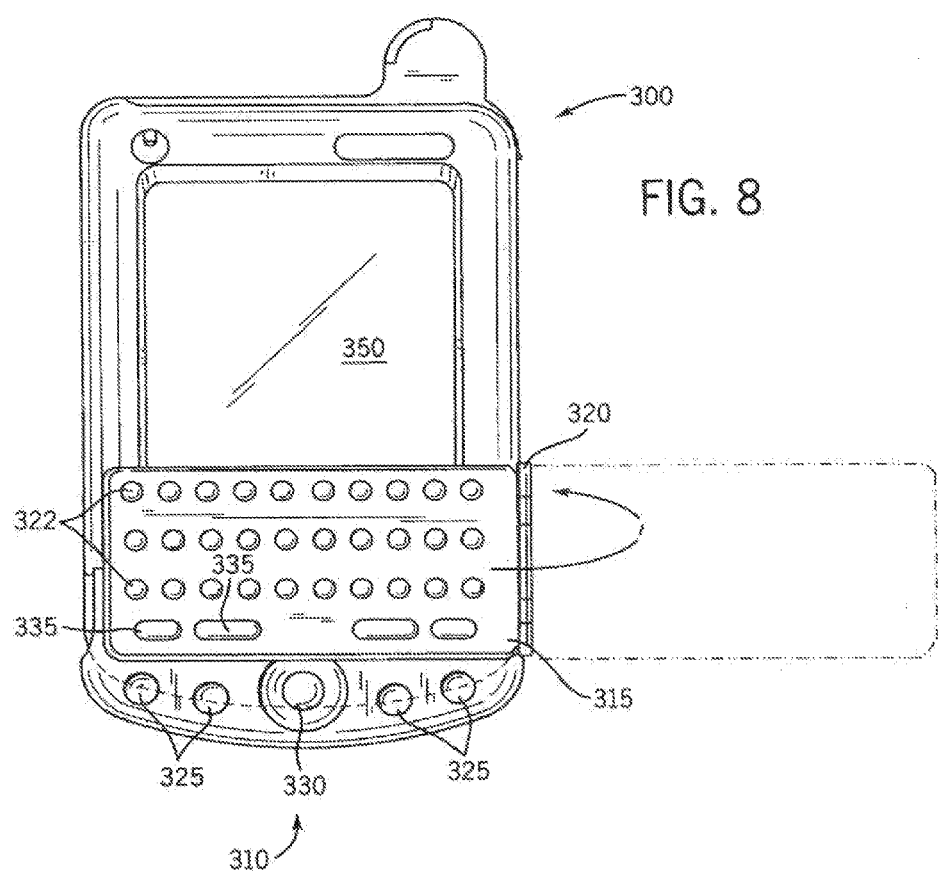
FIG. 8 is a depiction of another exemplary embodiment of a foldable keyboard device for an hand held computer.

Referring to FIGS. 1 and 2, a hand held computer 100 is depicted, having an integrated input device 110 according to an exemplary embodiment. Hand held computer 100 may include Palm™ style computers, and other devices manufactured by Palm, Inc., of Santa Clara, Calif. Other exemplary embodiments of the invention may include Windows CE™ hand held computers, or other hand held computers and personal digital assistants, as well as cellular telephones, and other mobile computing devices.

Preferably, hand held computer 100 includes interactive hardware and software that performs functions such as maintaining calendars, phone lists, task lists, notepads, calculation applications, spreadsheets, games, and other applications capable of running on a computing device. Hand held computer 100, as depicted in FIGS. 1 and 2 includes a plurality of input functions, keys 117 and a display 113 having graphical user interface features. Display 113 may be provided with an interface that allows a user to select and alter displayed content using a pointer, such as, but not limited to, a stylus 112 (shown stowed in FIG. 2). In an exemplary embodiment, display 113 also includes a writing section 118, which uses the Graffiti™ handwriting recognition software or other handwriting recognition software, for tracing alphanumeric characters as input. A plurality of input buttons 119 for performing automated or preprogrammed functions may be provided on a portion of display 113. In an exemplary embodiment, display 113 is a touch screen display that is electronically responsive to movements of a stylus on the surface of display 113. Button 155 on input device 110 may also be used to provide a variety of programmed functions, including, but not limited to scrolling functions.

Input device 110 may be one of several types of accessories, such as, but not limited to, a keyboard type input device. Input device 110 may include one or more ports for parallel and/or serial data transfer with other computers or data networks. Hand held computer 100 may utilize input device 110 for the purpose of inputting data and for performing other functions on hand held computer 100, for example. Input device 110 may be, in an exemplary embodiment integrated into hand held computer 100. Input device 110 may alternatively be a detachable device as discussed below in reference to FIGS. 3-7.

An antenna 125 for receiving and transmitting wireless communication signals may also be provided in an exemplary embodiment. Further, in an exemplary embodiment, antenna 125 may also include a light indicator 130 for indicating when a communications signal is being transmitted and/or received by hand held computer 100 or to indicate other states of hand held computer 100. In a further exemplary embodiment, hand held computer 100 may be used for any of a variety of wireless communications, including, but not limited to, communications with the World Wide Web, cellular telephone communications, e-mail communications, etc.

Because the requirements for manipulating data, such as, but not limited to text data, are heightened with access to wireless communications, such as e-mail and other information available over the World Wide Web, it may be advantageous to include an input device 110 that is a redundant input device to writing section 118. In an exemplary embodiment, input device 110 may be a keyboard having a keyboard platform 135 for supporting a plurality of keys 136. The plurality of keys may be any type of keys including alpha numeric keys and other function keys such as space key 137 and enter key 138. However, any of a variety of other keys may be included. Further, in an exemplary embodiment, a plurality of function keys may be included on platform 135. In an exemplary embodiment, keys 136 may be configured in a QWERTY keyboard format. Further, in an exemplary embodiment, keyboard platform 135 may include a hinge 140 dividing the keyboard into two sections, a folding section 145 and a substantially fixed section 150. In an exemplary embodiment, hinge 140 may be a living hinge, which is molded into platform 135. However, any of a variety of hinges may be used to couple sections 145 and 150 to each other. In an exemplary embodiment platform 135 may be covered with a rubberized or flexible membrane that allows for deformation of the keyboard platform 135 during typing and stowing.

As depicted in FIG. 1, a user may choose to place keyboard platform 135 in a closed position such that keys 136, 137, and 138 are not in plain view to a user and the user is provided access to writing area 118. Should a user wish to utilize the input functions of keyboard platform 135, the user would open the keyboard to the positions depicted in FIG. 2.

Referring now to FIG. 3, an alternative embodiment is depicted as hand held computer 200. Hand held computer 200 includes a display area 213, a plurality of function keys 217, and a writing section 218. Further, a plurality of input buttons 219 may be integrated into the touch screen to provide preprogrammed functions. Further, hand held device 200 may include an antenna 225 having an indicator light 230. In alternative embodiments, hand held device 200 is not necessarily provided with an antenna. Further still, alternative hand held computing devices 200 may optionally include having an antenna 225 and an indicator light 226. If indicator light 226 is provided, however, it may be located in any of a variety of areas not limited to antenna 225. Alternatively, hand held computer 200 may be configured with software which provides an indictor in display area 213.

In an exemplary embodiment, a detachable input device 210 is provided for electronic coupling to hand held computer 200. Input device 210 may be selectively coupled to hand held computer device 200 through an electrical connector located at a bottom portion of hand held computer 200. In an exemplary embodiment, input device 210 includes a support structure having a rear or sleeve portion 235 (see FIG. 5) that wraps around a rear face 238 of hand held computer 200. Further, detachable input device 210 includes a plurality of input buttons 217 which may or may not be configured to duplicate the functions of input buttons 216 (see FIG. 6). Further, detachable input device 210 includes an input button 242 that may be used for any of a variety of functions, including, but not limited to, scrolling. Further still, in an exemplary embodiment, detachable input device 210 includes a platform 245 for supporting a plurality of keys. In FIG. 3, platform 245 is shown in a closed position whereby the plurality of keys cannot be seen by a user.

FIG. 3 depicts input device 210 coupled to hand held computer 200 in such a manner that platform 245 conceals keys 246, but provides access to writing area 218 such that a mode of input, in particular, handwriting recognition, may be utilized.

As depicted in FIG. 7, input accessory 110 is configured to be sized for use by a single hand. For example, as depicted in FIG. 7, a user may hold the body of hand held computer 100 with the left hand and may subsequently type on keyboard platform 135 with a second hand. Input device 110 is not necessarily constrained to be sized for a single hand or is not necessarily used by a single hand. Alternatively, input accessory 110 may be sized for typing with two hands, or input accessory 110 may be used by two hands when hand held computer 100 is set on a table, desk, or the like or input may be provided to keys 136 by the user's thumbs while hand held computer 100 is held by a user's fingers.

In the embodiment depicted in FIG. 4, keyboard platform 245 is depicted in an open position. Keyboard platform 245 includes a hinge area 250 which allows keyboard platform 245 to open and close. Further, FIG. 5 depicts platform 245 being folded from an open position to a closed position. A hinge 240 allows the opening and closing action. Also, depicted in FIGS. 5 and 6, input device 210 is depicted as being a detachable keyboard device having a front portion, shown as platform 245 and a rear portion, shown as sleeve 235. As depicted in FIG. 6, input device 210 slides onto hand held computer 200 and is supported by sleeve 235 such that substantial movement of platform 245 relative to hand held computer 200 is avoided during use. Input device 210 is configured to be selectively attachable and detachable from hand held computer 200 and is configured such that a user may desire to attach input device 210 onto hand held computer 200 and optionally use redundant input areas represented by keys on platform 245 and by handwriting recognition area 218 without having to detach input device 210 from hand held computer 200 due to the folding stowability of platform 245, as depicted in FIG. 5.

Referring now to FIG. 8, an alternative embodiment of an input device 310 for a hand held computer 300 is depicted. Input device 310 may be either an integrated device integrated into hand held computer 300 or alternatively may be a detachable device that is selectively detachable from hand held computer 300. Input device 310 as shown is a keyboard device having a keyboard platform 315 with a plurality of keys 322. Further, input device 310 includes a plurality of function keys 325 and input key 330 and any of a variety of other types of keys 335 for carrying out a variety of functions including, but not limited to, shift and enter. In the exemplary embodiment shown, platform 315 is coupled to a hinge 320. Hinge 320 allows keyboard platform 315 to be rotated about an edge of keyboard platform 315 so that keyboard platform 315 may be rotated and stowed behind a rear surface of hand held computer 300. Input device 310 is not limited to the hinge configuration shown, but may be configured in a variety of ways to allow keyboard platform 315 to be stowed out of sight and to fully reveal a touch screen 350.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, communications bus, or processor used may differ. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device comprising:
   a body having a periphery;
   a display;
   an electrical connector;
   an input device comprising a movable section supporting a first subset of a set of keys and a fixed section supporting a second subset of the set of keys, the movable section having a first position and a second position, wherein the first and second subset of keys are concealed when the movable section is in the first position and the first and second subset of keys are accessible when the movable section is in the second position; and
   at least one button on the body of the mobile computing device that is not concealed when the movable section is in the first or second position,
   wherein the input device is carried on the body when the moveable section is in the first position and when the moveable section is in the second position, and
   wherein the moveable section is carried on the body when the moveable section is in the second position.

2. The mobile computing device of claim 1, wherein the input device comprises a miniature keyboard.

3. The mobile computing device of claim 1, wherein the set of keys are configured in a QWERTY configuration.

4. The mobile computing device of claim 1, wherein the set of keys comprises alphabetic keys.

5. The mobile computing device of claim 1, wherein the set of keys comprises alphanumeric keys.

6. The mobile computing device of claim 1, the movable section contained within the periphery of the body of the mobile computing device in the first and second positions.

7. The mobile computing device of claim 1, further comprising a support structure configured to support the input device, the support structure comprising a sleeve portion that wraps around a rear face of the mobile computing device, said sleeve portion configured to couple to the mobile computing device using the electrical connector.

8. The mobile computing device of claim 7, the support structure configured to couple to the mobile computing device body such that substantial movement of the support structure relative to the mobile computing device is prevented.

9. A detachable keyboard comprising:
   a movable section supporting a first subset of a set of keys; and
   a fixed section supporting a second subset of the set of keys, the movable section having a first position and a second position, wherein the first and second subset of keys are concealed when the movable section is in the first position and the first and second subset of keys are accessible when the movable section is in the second position;
   wherein the detachable keyboard is configured as part of a support structure, the support structure configured to detachably couple to a mobile computing device using an electrical connector,
   wherein the detachable keyboard is configured to be carried on the mobile computing device when the moveable section is in the first position and when the moveable section is in the second position, and
   wherein the moveable section is carried on the mobile computing device when the moveable section is in the second position.

10. The keyboard of claim 9, wherein the support structure is configured to couple to the mobile computing device such that substantial movement of the support structure relative to the mobile computing device is prevented.

11. The keyboard of claim 9, wherein the set of keys are configured in a QWERTY configuration.

12. The keyboard of claim 9, wherein the set of keys comprises alphabetic keys.

13. The keyboard of claim 9, wherein the detachable keyboard is a miniature keyboard and the set of keys comprises alphanumeric keys.

14. The keyboard of claim 9, wherein the mobile computing device comprises at least one button that is not concealed when the movable section of the keyboard is in the first or second position.

15. The keyboard of claim 14, wherein the at least one button comprises at least one of a function key, a personal information manager function key, an application launching key or a navigation key.

16. The keyboard of claim 9, wherein the keyboard is configured to slide onto the mobile computing device via a sleeve portion that wraps around a rear face of the mobile computing device.

17. A slidably attachable support structure for a keyboard comprising:
   a movable section supporting a first subset of a set of keys; and
   a fixed section supporting a second subset of the set of keys, the movable section having a first position and a second position, wherein the first and second subset of keys are concealed when the movable section is in the first position and the first and second subset of keys are accessible when the movable section is in the second position,
   wherein the support structure is configured to detachably couple to a mobile computing device using an electrical connector such that substantial movement of the support structure relative to the mobile computing device is prevented,
   wherein the support structure is configured to be carried on the mobile computing device when the moveable section is in the first position and when the moveable section is in the second position, and
   wherein the moveable section is carried on the mobile computing device when the moveable section is in the second position.

18. The support structure of claim 17, wherein the support structure is configured to reveal at least one button on the mobile computing device when the support structure is couple to the mobile computing device.

19. The support structure of claim 17, wherein the set of keys are configured in a QWERTY configuration.

20. The support structure of claim 17, wherein the support structure comprises a sleeve portion configured to wrap around a rear face of the mobile computing device to prevent substantial movement of the support structure relative to the mobile computing device during use.

* * * * *